United States Patent
Enomoto et al.

(10) Patent No.: US 8,662,511 B2
(45) Date of Patent: Mar. 4, 2014

(54) SUSPENSION DEVICE

(75) Inventors: Mitsuru Enomoto, Saitama (JP); Naoshi Sato, Kanagawa (JP); Yoshiharu Sugawara, Ibaraki (JP); Nobuhiro Shibuya, Chiba (JP)

(73) Assignees: Hino Motors, Ltd., Tokyo (JP); NHK Spring Co., Ltd, Yokohama-shi (JP)

( * ) Notice: Subject to any disclaimer, the term of this patent is extended or adjusted under 35 U.S.C. 154(b) by 0 days.

(21) Appl. No.: 13/813,797

(22) PCT Filed: Aug. 26, 2011

(86) PCT No.: PCT/JP2011/004754
§ 371 (c)(1),
(2), (4) Date: Feb. 1, 2013

(87) PCT Pub. No.: WO2012/029267
PCT Pub. Date: Mar. 8, 2012

(65) Prior Publication Data
US 2013/0127133 A1  May 23, 2013

(30) Foreign Application Priority Data
Aug. 31, 2010  (JP) ................................. 2010-193543

(51) Int. Cl.
*B60G 9/04* (2006.01)
*B60G 11/10* (2006.01)

(52) U.S. Cl.
USPC ......... 280/124.175; 280/17; 267/44; 267/260

(58) Field of Classification Search
USPC ......... 280/124.175, 124.17; 267/51, 36.1, 44, 267/45, 260, 265, 270, 271, 269
See application file for complete search history.

(56) References Cited

U.S. PATENT DOCUMENTS 3,841,655 A * 10/1974 Schaeff ................. 280/124.116
4,872,653 A * 10/1989 Chuchua ....................... 267/271
5,228,665 A *  7/1993 Berghus et al. ............... 267/262
(Continued)

FOREIGN PATENT DOCUMENTS

JP         6 173986      6/1994
JP         2010 241382   10/2010

OTHER PUBLICATIONS

International Search Report Issued Dec. 6, 2011 in PCT/JP2011/04754 Filed Aug. 26, 2011.
U.S. Appl. No. 13/816,746, filed Feb. 13, 2013, Enomoto et al.

*Primary Examiner* — Paul N Dickson
*Assistant Examiner* — Darlene P Condra
(74) *Attorney, Agent, or Firm* — Oblon, Spivak, McClelland, Maier & Neustadt, L.L.P.

(57) ABSTRACT

A suspension device for suspension of an axle 2 by an intermediate portion of a single leaf spring 5 has first restriction means which restricts, upon breakage of the leaf spring 5 at a position behind the intermediate portion of the spring, the rear portion of the leaf spring 5 from tilting downwardly relative to a shackle 6, and a second restriction means (retainer pawl 13) for restriction of the shackle 6 from pivotally moving backward beyond a predetermined angle. The first restriction means is constituted by a bush 12 with projections 12b which is arranged at a connection between the shackle 6 and the rear end of the leaf spring 5 for integral rotation with the rear end of the leaf spring 5 and engages with the shackle 6 at a predetermined rotary position.

2 Claims, 4 Drawing Sheets

(56) References Cited

U.S. PATENT DOCUMENTS

| | | | |
|---|---|---|---|
| 6,601,836 B1 * | 8/2003 | Dankow et al. | 267/271 |
| 6,951,343 B2 * | 10/2005 | Hildebrand | 280/124.175 |
| 7,229,088 B2 * | 6/2007 | Dudding et al. | 280/124.17 |
| 7,597,310 B2 * | 10/2009 | Solomon | 267/264 |
| 7,712,754 B2 * | 5/2010 | Penzotti | 280/124.175 |
| 2004/0080135 A1 * | 4/2004 | Dudding et al. | 280/124.163 |
| 2006/0290089 A1 * | 12/2006 | Dudding et al. | 280/124.116 |
| 2007/0090623 A1 * | 4/2007 | Preijert et al. | 280/124.175 |
| 2008/0128968 A1 * | 6/2008 | Platner et al. | 267/260 |
| 2009/0302513 A1 * | 12/2009 | Enomoto et al. | 267/39 |
| 2010/0127444 A1 * | 5/2010 | Glass | 267/264 |

* cited by examiner

SUSPENSION DEVICE

TECHNICAL FIELD

The present invention relates to a suspension device.

BACKGROUND ART

Conventionally, among various types of suspension devices for suspension of an axle from a frame, a suspension device with a plurality of layered leaf springs, which is simple in structure, less expensive and highly strong and durable, has been extensively used for a truck or other vehicle.

In such suspension device, it is a matter of course to mount the plural layered leaf springs so as to enable positioning of the axle even if any of the springs breaks, which however disadvantageously results in increases in weight of the vehicle. Thus, a suspension device has been studied which comprises a single leaf spring for weight saving.

There exists, for example, the following Patent Literature 1 as prior art document relating to this kind of leaf suspension.

CITATION LIST

Patent Literature

[Patent Literature 1] JP 6-173986A

SUMMARY OF INVENTION

Technical Problems

In the case of a single leaf spring used and if the spring breaks at a position behind an axle-suspending intermediate portion of the spring, a rear portion of the spring behind the break position of the spring may tilt downward into contact with a ground and thus a vehicle body may lift up in pole-vault manner using the rear portion of the spring as support into movement of wheels away from the ground. It is feared that, for example in the case of front wheels being moved away, loss of steering and/or braking may be caused; in the case of rear wheels being moved away, loss of braking and/or non-transmittal of a driving force to the ground may be caused.

The invention was made in view of the above and has its object to prevent a rear portion of a leaf spring from tilting downward into contact with a ground even if the spring breaks at a position behind an intermediate portion of the spring.

Solution to Problems

The invention is directed to a suspension device in which front and rear brackets are arranged on a side rail ahead of and behind an axle, respectively, a single leaf spring being pivoted at a front end thereof to the front bracket and being pivoted at a rear end thereof to the rear bracket through a shackle pivotally movable backward and forward, said axle being suspended by an intermediate portion of said leaf spring, characterized in that it comprises first restriction means for restricting a rear portion of said leaf spring from tilting downward upon breakage of said leaf spring at a position behind the intermediate portion of the spring and second restriction means for restricting said shackle from pivotally moving backward beyond a predetermined angle, said first restriction means comprising a bush arranged at a connection between said shackle and the rear end of said leaf spring for integral rotation with the rear end of said leaf spring and having projections for engagement with said shackle at a predetermined rotary position.

Thus, in this way, upon the breakage of the leaf spring at the position behind the intermediate portion of the spring, the shackle is restricted by the second restriction means from pivotally moving backward beyond the predetermined angle while the projections of the bush as the first restriction means engage with the shackle at the predetermined rotary position to be unable to rotate further, thereby restricting the leaf spring from pivotally moving downward beyond a predetermined angle, so that there is no fear that the broken rear portion of the leaf spring contacts the ground.

The invention is also directed to a suspension device in which front and rear brackets are arranged on a side rail ahead of and behind an axle, respectively, a single leaf spring being pivoted at a front end thereof to the front bracket and being pivoted at a rear end thereof to the rear bracket through a shackle pivotally movable backward and forward, said axle being suspended by an intermediate portion of said leaf spring, characterized in that it comprises first restriction means for restricting a rear portion of said leaf spring from tilting downward upon breakage of said leaf spring at a position behind the intermediate portion of the spring and second restriction means for restricting said shackle from pivotally moving backward beyond a predetermined angle, said first restriction means comprising an engagement member fitted over the rear end of said leaf spring for integral rotation with the rear end of said leaf spring and having a projection for engagement with said rear bracket at a predetermined rotary position.

Thus, in this way, upon the breakage of the leaf spring at the position behind the intermediate portion of the spring, the shackle is restricted by the second restriction means from pivotally moving backward beyond the predetermined angle while the projection of the engagement member as the first restriction means engages with the rear bracket at the predetermined rotary position to be unable to rotate further, thereby restricting the leaf spring from pivotally moving downward beyond a predetermined angle, so that there is no fear that the broken rear portion of the leaf spring contacts the ground.

The invention is also directed to a suspension device in which front and rear brackets are arranged on a side rail ahead of and behind an axle, respectively, a single leaf spring being pivoted at a front end thereof to the front bracket and being pivoted at a rear end thereof to the rear bracket through a shackle pivotally movable backward and forward, said axle being suspended by an intermediate portion of said leaf spring, characterized in that it comprises first restriction means for restricting a rear portion of said leaf spring from tilting downward upon breakage of said leaf spring at a position behind the intermediate portion of the spring and second restriction means for restricting said shackle from pivotally moving backward beyond a predetermined angle, said first restriction means comprising an eye formed by the rear end of said leaf spring and rotatably wound around a horizontal pin on a lower portion of the shackle, said eye being tapered into reduced thickness toward a tip in a winding direction so as to engage with said rear bracket at a predetermined rotary position due to increase in thickness.

Thus, in this way, upon the breakage of the leaf spring at the position behind the intermediate portion of the spring, the shackle is restricted by the second restriction means from pivotally moving backward beyond the predetermined angle while the eye as the first restriction means engages with the rear bracket at the predetermined rotary position due to increase in thickness to be unable to rotate further, thereby restricting the leaf spring from pivotally moving downward beyond a predetermined angle, so that there is no fear that the broken rear portion of the leaf spring contacts the ground.

Advantageous Effects of Invention

According to the suspension device of the invention mentioned in the above, excellent effects and advantages can be obtained. Even if a leaf spring breaks at a position behind an intermediate portion of the spring, the leaf spring can be restricted from pivotally moving downward beyond a predetermined angle and a rear portion of the leaf spring can be preliminarily prevented from tilting downward into contact with a ground. Thus, lift of a vehicle body in pole-vault manner using the rear portion of the leaf spring as support can be reliably averted to substantially improve the safety.

DESCRIPTION OF EMBODIMENTS

Embodiments of the invention will be described in conjunction with the drawings.

Figure 1:
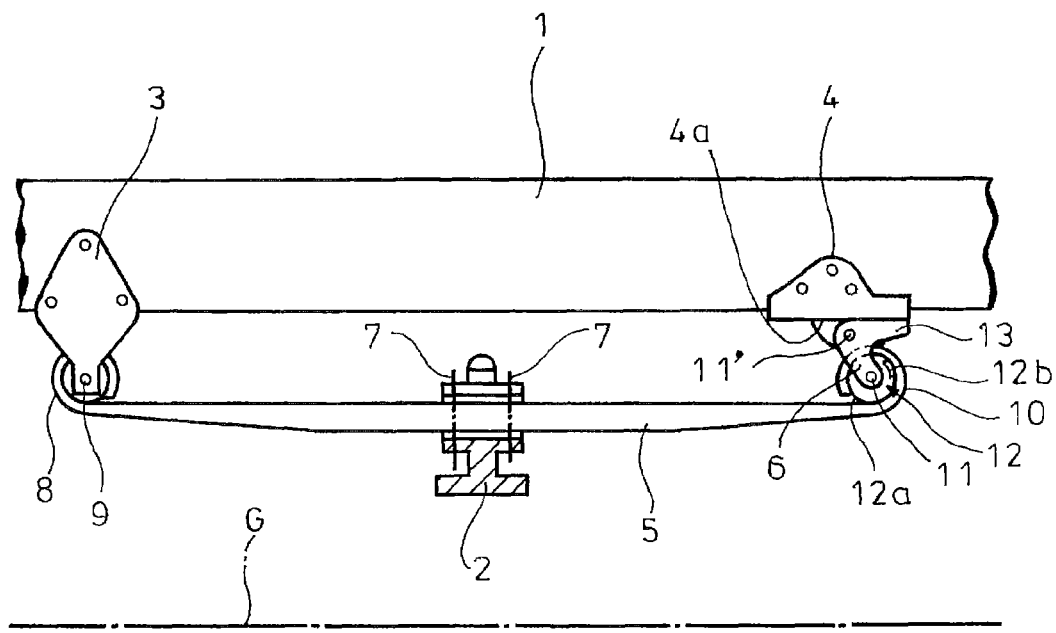
FIG. 1 is a side view showing a first embodiment of a suspension device according to the invention.

FIGS. 1-4 show a first embodiment of a suspension device according to the invention. As shown in FIG. 1, in this embodiment, front and rear brackets 3 and 4 are arranged on a side rail 1 ahead of and behind an axle 2, respectively. A single leaf spring 5 is pivoted at a front end thereof to the front bracket 3 and is pivoted at a rear end thereof to the rear bracket 4 through a shackle 6 which in turn is pivotally movable backward and forward. The axle 2 is suspended by an intermediate portion of the leaf spring 5.

More specifically, the axle 2 is connected to a lower surface of the intermediate portion of the leaf spring 5 through U-shaped bolts 7. The front end of the leaf spring 5 is wound upwardly into an eye 8 which is rotatably wound around a horizontal pin 9 of the front bracket 3 on the side rail 1. Just like the front end of the leaf spring 5, the rear end of the spring is wound upwardly into an eye 10 which is rotatably wound around a horizontal pin 11 of a lower portion of the shackle 6 which in turn is pivotally movable backward and forward about a horizontal pin 11' of the rear bracket 4 on the side rail 1.

Figure 2:
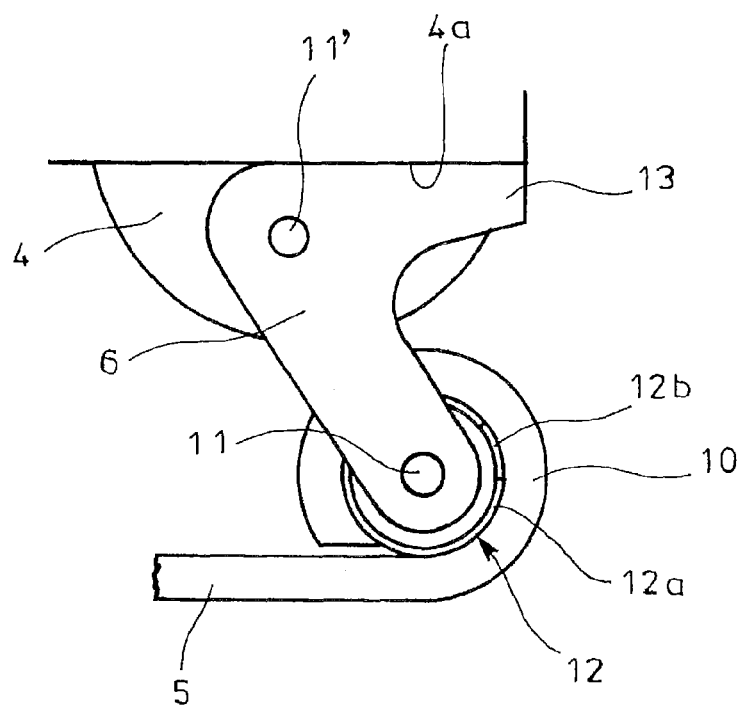
FIG. 2 is an enlarged view showing important parts in FIG. 1.
Figure 3:
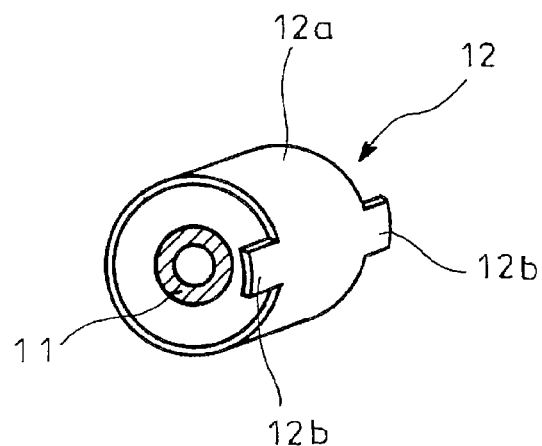
FIG. 3 is a perspective view showing particulars of a bush in FIG. 1.

As shown in FIG. 2 in enlarged scale, for winding of the eye 10 of the rear end of the leaf spring 5 around a horizontal pin 11 of a lower portion of the shackle 6, a bush 12 is intervened between the pin 11 and the eye 10. In the embodiment, an outer cylinder 12a of the bush 12 is circumferentially formed with a pair of projections 12b (see FIG. 3) protruding oppositely and laterally of a vehicle (perpendicularly to FIG. 2 plane). Upon breakage of the leaf spring 5 at a position behind an intermediate portion of the spring, the bush 12 functions as first restriction means for restriction of the rear portion of the leaf spring 5 from tilting downward.

Specifically, upon the breakage of the leaf spring 5 at the position behind the intermediate portion of the spring, the bush 12 rotates together with the eye 10 constituting the rear end of the leaf spring 5 and the projection 12b engages with the shackle 6 at a predetermined rotary position, thereby restricting the rear portion of the leaf spring 5 from tilting downward.

As second restriction means for restriction of the shackle 6 from pivotally moving backward beyond a predetermined angle, a length of retainer pawl 13 protrudes backward from an upper end of the shackle 6. Thus, even if upon the breakage the shackle 6 tries to pivotally move backward due to a load of the rear portion of the leaf spring 5 applied, the retainer pawl 13 engages with a step 4a of the rear bracket 4 to restrict the shackle 6 from pivotally moving backward beyond the predetermined angle.

Here, FIGS. 1 and 2 are illustrations where a truck or other objective vehicle is in gross vehicle weight condition. In such condition, the engagement of the retainer pawl 13 of the shackle 6 with the step 4a of the rear bracket 4 restricts the backward pivotal movement of the shackle while the projections 12b of the bush 12 are kept away from the shackle 6 with a required gap, such gas remaining a little even in an empty vehicle weight condition.

Specifically, the rear end of the leaf spring 5 extends most backward when the spring is flattened in the gross vehicle weight condition. Therefore, when the engagement of the retainer pawl 13 of the shackle 6 with the step 4a of the rear bracket 4 restricts the backward pivotal movement of the shackle in the gross vehicle weight condition, functions of the shackle 6 are not hurt. Moreover, when the gap between the projections 12b and the shackle 6 remains a little even in the empty vehicle weight condition, the projections 12b can be caused not to abut on the shackle 6 within a suspension stroke.

In this regard, it is necessary to set the tilting angle of the rear portion of the leaf spring 5 restricted by the projections 12b of the bush 12 within an angle range where the rear portion of the leaf spring 5 can be surely prevented from contacting with the ground G even if the leaf spring 5 breaks at a position just behind the axle 2 and thus the rear portion of the spring has a maximum length.

Figure 4:
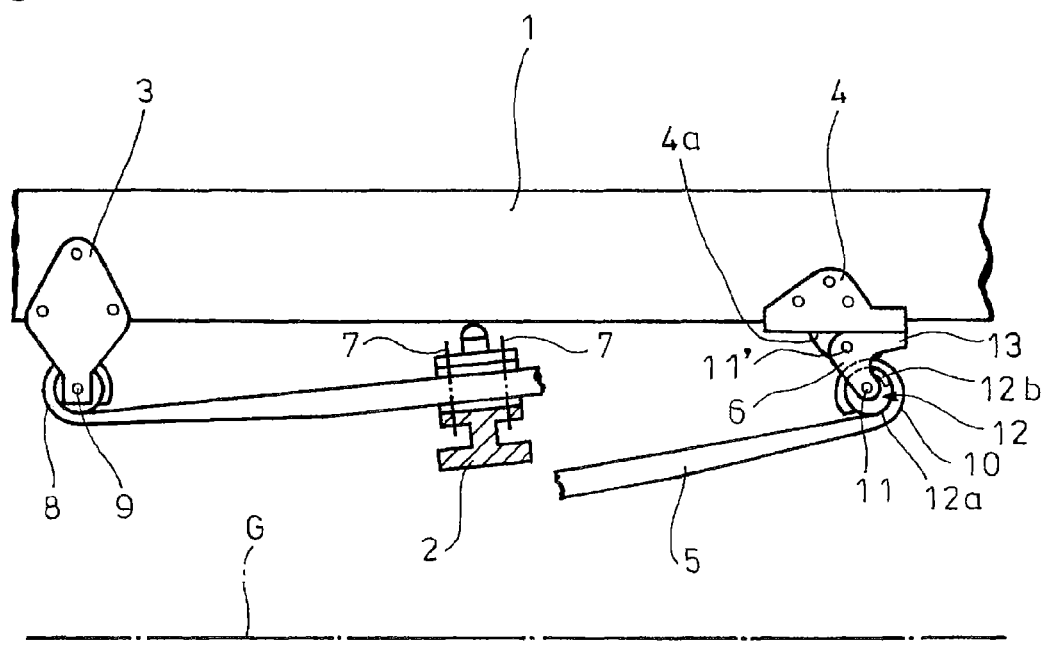
FIG. 4 is a side view showing a leaf spring in FIG. 1 upon breakage.

With the suspension device thus constructed, upon the breakage of the leaf spring 5 at the position behind the intermediate portion of the spring as shown in FIG. 4, the engagement of the retainer pawl 13 with the step 4a of the rear bracket 4 restricts the shackle 6 from pivotally moving backward beyond the predetermined angle while the projections 12b of the bush 12 engage with the shackle 6 at the predetermined rotary position to unable to rotate further, thereby restricting the leaf spring 5 from tilting downward beyond the predetermined angle, so that there is no fear that the broken rear portion of the leaf spring 5 contacts the ground G.

Thus, according to the above embodiment, even if the leaf spring 5 breaks at the position behind the intermediate portion of the spring, the leaf spring 5 can be restricted from pivotally moving downward beyond the predetermined angle and the rear portion of the leaf spring 5 can be preliminarily prevented from tilting downward into contact with the ground G, so that the lift of the vehicle body in pole-vault manner using the rear portion of the leaf spring 5 as support can be surely averted to substantially improve the safety.

Figure 5:
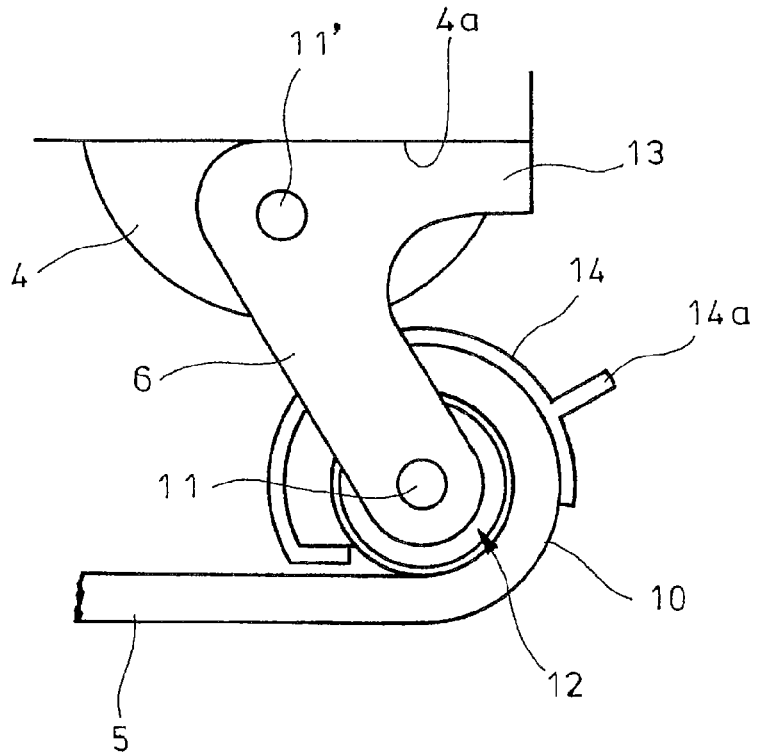
FIG. 5 is a side view showing a second embodiment of the suspension device according to the invention.
Figure 6:
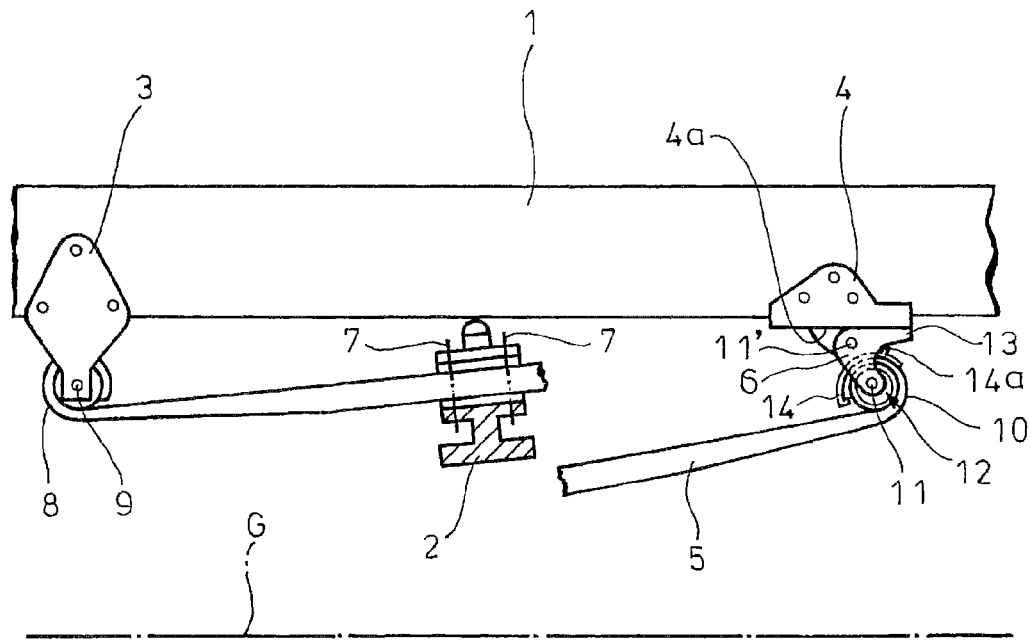
FIG. 6 is a side view showing a leaf spring in FIG. 5 upon breakage.

FIGS. 5 and 6 show a second embodiment of a suspension device according to the invention. As shown in FIG. 5, in this embodiment, in place of the bush 12 with the projections 12b as the first restriction means in the previous first embodiment, the first restriction means comprises an engagement member 14 fitted over an outer periphery of an eye 10 constituting the rear end of the leaf spring 5 for integral rotation with the eye 10 and having a projection 14a for engagement with the lower end of the rear bracket 4 at a predetermined rotary position.

Specifically, upon the breakage of the leaf spring 5 at a position behind the intermediate portion of the spring, the engagement member 14 rotates integrally with the eye 10 constituting the rear end of the leaf spring 5 and the projection 14a engages with a lower end of the rear bracket 4 at the predetermined rotary position, thereby restricting the rear portion of the leaf spring 5 from tilting downward.

Also in the second embodiment, as the second restriction means for restricting the shackle 6 from pivotally moving backward beyond a predetermined angle, a length of retainer pawl 13 protrudes backward from an upper end of the shackle 6. Thus, even if upon the breakage the shackle 6 tries to pivotally move backward due to a load of the rear portion of the leaf spring 5 applied, the engagement of the retainer pawl 13 with the step 4a of the rear bracket 4 restricts the shackle 6 from pivotally moving backward beyond the predetermined angle.

FIG. 5 is an illustration where a truck or other objective vehicle is in the gross vehicle weight condition. In such condition, the engagement of the retainer pawl 13 of the shackle 6 with the step 4a of the rear bracket 4 restricts pivotal movement of the shackle while the projection 14a of the engagement member 14 is kept away from the lower end of the rear bracket 4 with a required gap, such gas remaining a little even in the empty vehicle weight condition.

Specifically, the rear end of the leaf spring 5 extends most backward when the spring is flattened in the gross vehicle weight condition. Therefore, when the engagement of the retainer pawl 13 of the shackle 6 with the step 4a of the rear bracket 4 restricts the rearward pivotal movement in the gross vehicle weight condition, functions of the shackle 6 are not hurt. Moreover, when the gap between the projection 14a and the rear end of the rear bracket 4 remains a little even in the empty vehicle weight condition, the projection 14a can be caused not to abut on the lower end of the rear bracket 4 within a suspension stroke.

In this regard, it is necessary to set the tilting angle of the rear portion of the leaf spring 5 restricted by the projection 14a of the engagement member 14 within an angle range where the rear portion of the leaf spring 5 can be surely prevented from contacting with the ground G even if the leaf spring 5 breaks at a position just behind the axle 2 and thus the rear portion of the spring has a maximum length.

With the suspension device thus constructed, upon the breakage of the leaf spring 5 at the position behind the intermediate portion of the spring as shown in FIG. 6, the engagement of the retainer pawl 13 with the step 4a of the rear bracket 4 restricts shackle 6 from pivotally moving backward beyond the predetermined angle while the projection 14a of the engagement member 14 engages with the lower end of the rear bracket 4 at a predetermined rotary position to be unable to rotate further, thereby restricting the leaf spring 5 from pivotally moving downward beyond the predetermined angle, so that there is no fear that the broken rear portion of the leaf spring 5 contacts the ground G.

Thus, also in such second embodiment, upon the breakage of the leaf spring 5 at the position behind the intermediate portion of the spring, the leaf spring 5 can be restricted from tilting downward beyond the predetermined angle and the rear portion of the leaf spring 5 can be preliminarily prevented from tilting downward into contact with the ground G, so that the lift of the vehicle body in pole-vault manner using the rear portion of the leaf spring 5 as support can be surely averted to substantially improve the safety.

Figure 7:
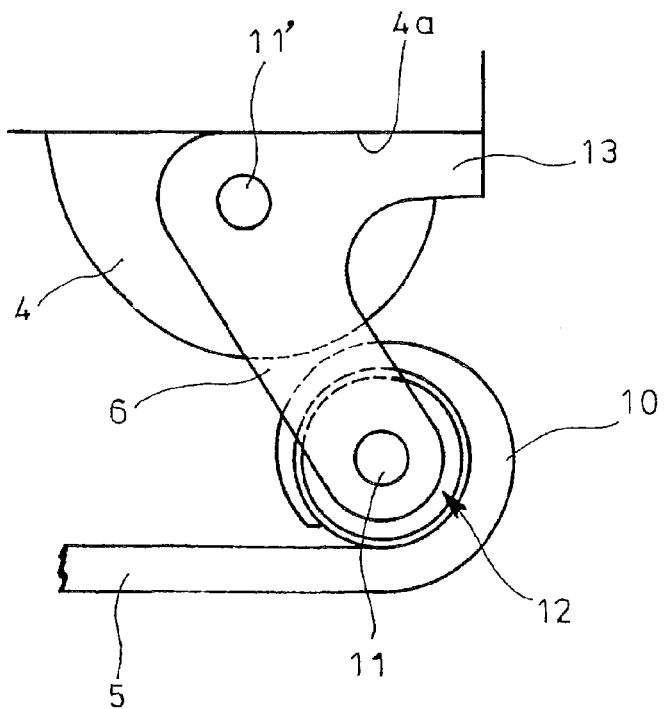
FIG. 7 is a side view showing a third embodiment of the suspension device according to the invention.
Figure 8:
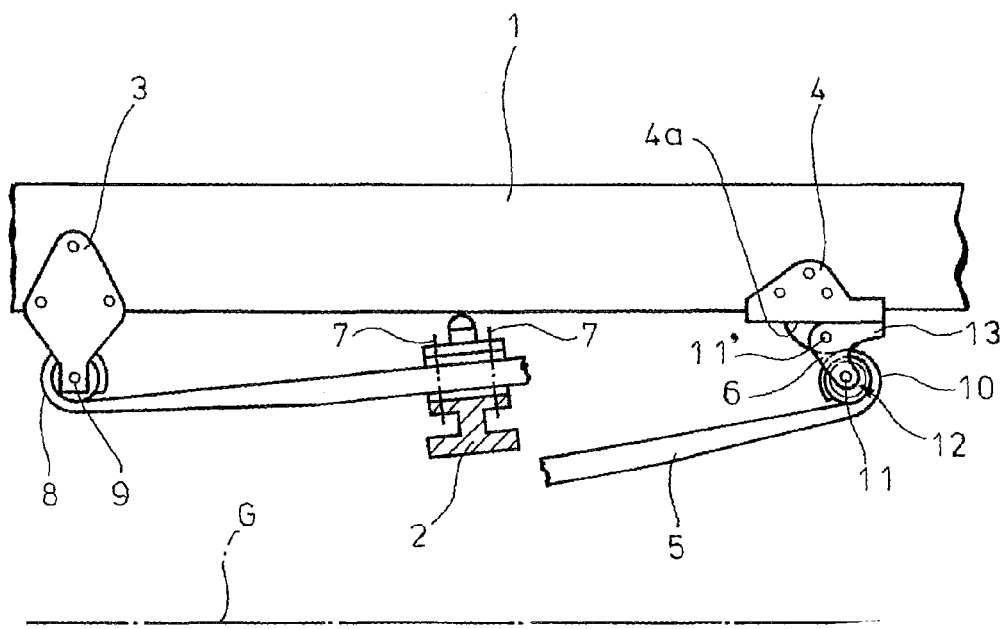
FIG. 8 is a side view showing a leaf spring in FIG. 7 upon breakage.

FIGS. 7 and 8 show a third embodiment of a suspension device according to the invention. As shown in FIGS. 7 and 8, in this embodiment, in place of the engagement member 14 with the projection 14a as the first restriction means in the previous second embodiment, the first restriction means comprises an eye 10 formed by the rear end of the leaf spring 5 and rotatably wound around a horizontal pin 11 on the lower portion of the shackle 6, the eye being tapered into reduced thickness toward a tip in a winding direction so as to engage with the lower end of the rear bracket 4 at the predetermined rotary position due to increase in thickness.

Specifically, upon the breakage of the leaf spring 5 at a position behind the intermediate portion of the spring, the eye 10 constituting the rear end of the leaf spring 5 rotates and engages with the lower end of the rear bracket 4 at a predetermined rotary position due to increase in thickness, thereby restricting the rear portion of the leaf spring 5 from tilting downward.

Moreover, also in this third embodiment, as the second restriction means for restricting the shackle 6 from pivotally moving backward beyond the predetermined angle, a length of retainer pawl 13 protrudes backward from an upper end of the shackle 6. Thus, even if upon the breakage the shackle 6 tries to pivotally move backward due to a load of the rear portion of the leaf spring 5 applied, the engagement of the retainer pawl 13 with the step 4a of the rear bracket 4 restricts the shackle 6 from pivotally moving backward beyond the predetermined angle.

Here, FIG. 7 is an illustration where a truck or other objective vehicle is in gross vehicle weight condition. In such condition, the engagement of the retainer pawl 13 of the shackle 6 with the step 4a of the rear bracket 4 restricts the backward pivotal movement while the eye 10 is kept away from a lower end of the rear bracket 4 with a required gap, such gap remaining a little even in an empty vehicle weight condition.

Specifically, the rear end of the leaf spring 5 extends most backward when the spring is flattened in the gross vehicle weight condition. Therefore, when the engagement of the retainer pawl 13 of the shackle 6 with the step 4a of the rear bracket 4 restricts the backward pivotal movement in the gross vehicle weight condition, functions of the shackle 6 are not hurt. Moreover, when the gap between the eye 10 and the lower end of the rear bracket 4 remains a little even in the empty vehicle weight condition, the eye 10 can be caused not to abut on the lower end of the rear bracket 4 within a suspension stroke.

In this regard, it is necessary to set the tilting angle of the leaf spring 5 restricted by thickness of the eye 10 within an angle range where the rear portion of the leaf spring 5 can be surely prevented from contacting with the ground G even if the leaf spring 5 breaks at a position just behind the axle 2 and thus the rear portion of the spring has a maximum length.

With the suspension device thus constructed, upon the breakage of the leaf spring 5 at the position behind the intermediate portion of the spring as shown in FIG. 8, the engagement of the retainer pawl 13 with the step 4a of the rear bracket 4 restricts the shackle 6 from pivotally moving backward beyond the predetermined angle while the eye 10 engages with the lower end of the rear bracket 4 at the predetermined rotary position to be unable to rotate further, thereby restricting the leaf spring 5 from tilting downward beyond a predetermined angle, so that there is no fear that the broken rear portion of the leaf spring 5 contacts the ground G.

Thus, also in such third embodiment, upon the breakage of the leaf spring 5 at the position behind the intermediate portion of the spring, the leaf spring 5 can be restricted from tilting backward beyond the predetermined angle and the rear portion of the leaf spring 5 can be preliminarily prevented from tilting backward into contact with the ground G, so that lift of the vehicle body in pole-vault manner using the rear portion of the leaf spring 5 as support can be surely averted to substantially improve the safety.

It is to be understood that a suspension device according to the invention is not limited to the above embodiments and that various changes and modifications may be made without departing from the scope of the invention.

REFERENCE SIGNS LIST 1 side rail
2 axle
3 front bracket
4 rear bracket
5 leaf spring
6 shackle
10 eye (first restriction means)
11 horizontal pin
12 bush (first restriction means)
12b projection
13 retainer pawl (second restriction means)
14 engagement member (first restriction means)
14a projection

The invention claimed is:

1. A suspension device in which front and rear brackets are arranged on a side rail ahead of and behind an axle, respectively, a single leaf spring being pivoted at a front end thereof to the front bracket and being pivoted at a rear end thereof to the rear bracket through a shackle pivotally movable backward and forward, said axle being suspended by an intermediate portion of said leaf spring, comprising first restriction means for restricting a rear portion of said leaf spring from tilting downward upon breakage of said leaf spring at a position behind the intermediate portion of the spring and second restriction means for restricting said shackle from pivotally moving backward beyond a predetermined angle, said first restriction means comprising an engagement member fitted over the rear end of said leaf spring for integral rotation with the rear end of said leaf spring and having a projection for engagement with said rear bracket at a predetermined rotary position.

2. A suspension device in which front and rear brackets are arranged on a side rail ahead of and behind an axle, respectively, a single leaf spring being pivoted at a front end thereof to the front bracket and being pivoted at a rear end thereof to the rear bracket through a shackle pivotally movable backward and forward, said axle being suspended by an intermediate portion of said leaf spring, comprising first restriction means for restricting a rear portion of said leaf spring from tilting downward upon breakage of said leaf spring at a position behind the intermediate portion of the spring and second restriction means for restricting said shackle from pivotally moving backward beyond a predetermined angle, said first restriction means comprising an eye formed by the rear end of said leaf spring and rotatably wound around a horizontal pin on a lower portion of the shackle, said eye being tapered into reduced thickness toward a tip in a winding direction so as to engage with said rear bracket at a predetermined rotary position due to increase in thickness.

* * * * *